United States Patent
Eliyahu

(10) Patent No.: US 9,806,546 B2
(45) Date of Patent: Oct. 31, 2017

(54) BATTERY ADAPTOR APPARATUS

(71) Applicant: Nexark, Inc., Los Angeles, CA (US)

(72) Inventor: Menachem Eliyahu, Los Angeles, CA (US)

(73) Assignee: NEXARK, INC., Los Angeles, CA (US)

( * ) Notice: Subject to any disclaimer, the term of this patent is extended or adjusted under 35 U.S.C. 154(b) by 101 days.

(21) Appl. No.: 15/001,016

(22) Filed: Jan. 19, 2016

(65) Prior Publication Data

US 2017/0207643 A1    Jul. 20, 2017

(51) Int. Cl.
*H02J 7/00*        (2006.01)

(52) U.S. Cl.
CPC .......... *H02J 7/0042* (2013.01); *H02J 7/0052* (2013.01)

(58) Field of Classification Search
CPC .................. H02J 7/0042–7/0045; H02J 7/0052
See application file for complete search history.

(56) References Cited

U.S. PATENT DOCUMENTS

| | | | | |
|---|---|---|---|---|
| 9,241,096 B2 * | 1/2016 | Samuels | ............ | H04N 5/2252 |
| 9,426,339 B2 * | 8/2016 | Pacurariu | ............ | G03B 17/56 |
| 2009/0316038 A1 * | 12/2009 | Schmack | ............ | H04N 5/2251 348/373 |
| 2010/0060747 A1 * | 3/2010 | Woodman | ............ | G03B 17/02 348/222.1 |
| 2015/0380709 A1 * | 12/2015 | Mizrahi | ............ | H01M 2/1066 429/93 |

* cited by examiner

*Primary Examiner* — Drew A Dunn
*Assistant Examiner* — Tynese McDaniel
(74) *Attorney, Agent, or Firm* — Leason Ellis LLP

(57) ABSTRACT

The present invention concerns a power supply apparatus configured for coupling to an electronic device having a power port integral to the electronic device and a particular hardware profile. The power supply apparatus includes: a housing configured to extend the hardware profile of the electronic device in at least one dimension, a power source integral to the housing, and a power interface extending from the housing and configured to couple with the power port of the electronic device. A securing device integral to the housing is configured to couple the housing to the electronic device. Where the electronic device has a door covering its power port in a closed position and uncovering its port in an open extended position, the housing has a cover receiver for receiving the floor and maintaining the form factor of the electronic device and power supply.

11 Claims, 5 Drawing Sheets

BATTERY ADAPTOR APPARATUS

FIELD OF THE INVENTION

The present invention relates to an apparatus for supplying an electronic device with supplemental or auxiliary power to improve device usage time while maintaining the electronic devices aesthetic design.

BACKGROUND OF THE INVENTION

The number of portable electronic devices increases every year. Tablet computers, cameras, keypads, input devices, smart phones, storage devices, media players, health trackers, watches, navigation systems, and other devices utilize internal, often rechargeable batteries to function.

While the features of such devices continue to increase, battery capacity has not kept pace. As such, there is a need for battery extenders and power supplies that increase the usage time of an electronic device. One solution is to connect an auxiliary battery to the electronic device in order to provide supplemental power. However, many electronic devices use battery compartments, or covers, to hide charging ports which makes using a battery extender during operation difficult or unsightly. Additionally, some battery extenders radically change the overall appearance of an electronic device, such as through the use of a battery encasement for smart phones. Users can find the change to the overall aesthetics of the electronic device to be a drawback, one that is not overcome by increased battery life. Therefore, what is needed is an apparatus that provides additional electrical power, but also takes into account securing or incorporating battery covers into the overall form factor in order to maintain the design profile or form factor of the electronic device.

Thus, it would be advantageous if a power supply were provided that maintained the overall look and feel of the electronic device form factor and could be attached to the electronic device in a way that secured or incorporated an open battery or charging compartment.

SUMMARY OF THE INVENTION

In accordance with a broad aspect of the present invention a power supply apparatus is provided that is configured to coupling to an electronic device, the electronic device having a power port integral to the electronic device and the electronic device having a hardware profile. The power supply apparatus comprises a housing configured to extend a profile of the electronic device in at least one dimension, a power source integral to the housing; and a power interface extending from the housing and configured to couple with the power port of the electronic device. A securing device integral to the housing is configured to couple the housing to the electronic device.

In one or more embodiments, where the electronic device utilizes a door or cover to cover the power port, the housing of the power supply is further configured to incorporate a recess for receiving such a cover or door.

In one embodiment the power port of the electronic device is a USB port and the hardware interface of the power supply apparatus is a USB connector. In a further embodiment the integrated power source is a rechargeable battery.

In a yet another embodiment, the present invention includes an encasement configured to encase both the electronic device and the power supply. In a further embodiment, the encasement is waterproof.

BRIEF DESCRIPTION OF THE DRAWINGS

The foregoing and other features of the present invention will be more readily apparent from the following detailed description and drawings of exemplary embodiments of the invention where.

DETAILED DESCRIPTION OF CERTAIN EMBODIMENTS OF THE INVENTION

By way of overview and introduction, the present invention concerns an apparatus to supply additional or supplementary electrical power to an electronic device while maintaining and extending the hardware profile or design thereof.

Figure 1:
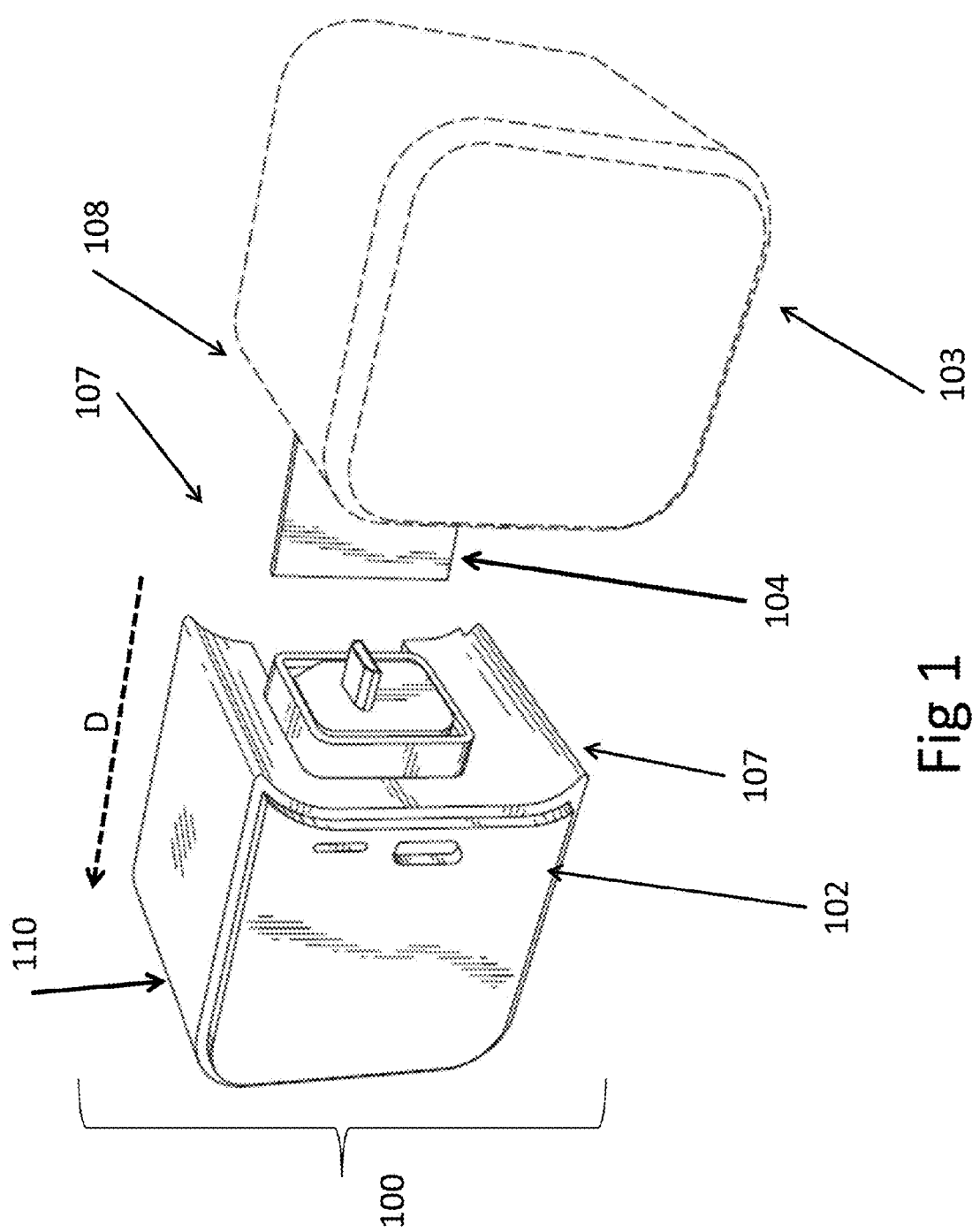
FIG. 1 is a rear perspective view of the power supply apparatus of the present invention shown uncoupled to an electronic device.

With reference to the illustration provided in FIG. 1, the power supply apparatus 100 of the present invention is configured to couple to an electronic device 103 and supply that device with electrical energy though a power port of the camera. In the provided example, the electronic device 103 is a digital camera (e.g. a GoPro® HERO4 Session) with a roughly cube-like hardware profile. However, those skilled in the art will appreciate that the electronic device 103 can in alternative embodiments have different form factors, functions and dimensions than those provided in the illustrated examples.

The power supply apparatus 100 is defined by a housing 102. The housing 102 extends the form factor appearance of the electronic device 103 in at least one dimension (D). In prior art devices, e.g power extenders cases for smartphones, the case changes the length, width and thickness of the device. In one or more embodiments the housing 102, presents complementary surfaces and structures to the electronic device 103. Turning to the illustration of FIG. 1, the housing 102 defines complementary form factor features 107 that are complementary to the form factor features 108 of the electronic device 103. Here, the housing 102 presents a concave surface that when aligned with the convex surface of the electronic device 103, results in a substantially continuous form factor or appearance. However, those possessing an ordinary level of skill in the art will appreciate that the housing 102 is not limited to a particular shape or size, but is configured to provide a complementary shape or configuration when used with the electronic device.

In a further embodiment, the housing 102 is configured to extend the form factor or profile of the electronic device 103 in at least two dimensions. By extending the form factor profile, the power supply apparatus maintains the over all aesthetic design of the electronic device 103 while also providing improved functionality.

In a particular embodiment, the housing 102 is formed of metal, plastic, composite, wood or other a combination of the same or other materials suitable for such construction. In a further arrangement, the housing 102 is formed of the same material, and has the same color, tone, texture or markings as the electronic device 103.

The housing 102 further incorporates a power supply (not shown). In one particular embodiment, the power supply is a battery pack. For example, the power supply is one or more type A, AA, AAA, C, D or other battery type. In a further arrangement, the battery pack is a rechargeable battery pack, such as a lithium ion or other rechargeable battery type. In an alternative embodiment, the power supply is a fuel cell, such as hydrogen or hydrocarbon sourced fuel cell. In yet a further alternative embodiment, the power source is one or more capacitors arranged to discharge electric energy.

In a particular configuration of the embodiment described, the housing 102 is configured with a charging or replenishment port (not shown). The charging port allows for the power supply to be recharged without having to separate the housing 102 from the electronic device 103. In one or more embodiments, the housing 102 is equipped with control circuity, such as one or more connected or linked microprocessors, that manage power flow and provide protection against faults or overcharging the power supply or the electrical device 103. In a further arrangement, the housing is equipped with charging lights or indicators controlled by the microprocessor that indicate the level or electrical energy stored in the power supply.

In a particular configuration, the power supply is removable from the housing 102. For example, the housing 102 is equipped with a compartment or access element 110 that allows a user to extract or replace the power supply (i.e. batteries).

The housing 102 of the power supply apparatus incorporates a power interface 104. The power interface 104 is configured to couple to a power port (not shown) integral to the form factor of the electronic device 103. In a particular arrangement, the power interface is a USB-A/B/C, firewire, hdmi, lightening cable or other connection type interface and the power port is a complementary receiver. Alternatively, the power interface 104 and power port are custom or proprietary interface connections that are complementary with one another. In yet a further arrangement, the power interface 104 and the power port are also configured to bi-directionally transmit data as well as electrical energy. In yet a further embodiment, the power interface 104 is a wireless or contactless power transmission device and the power port of the electronic device 103 is configured to receive such an energy transmission.

Figure 2:
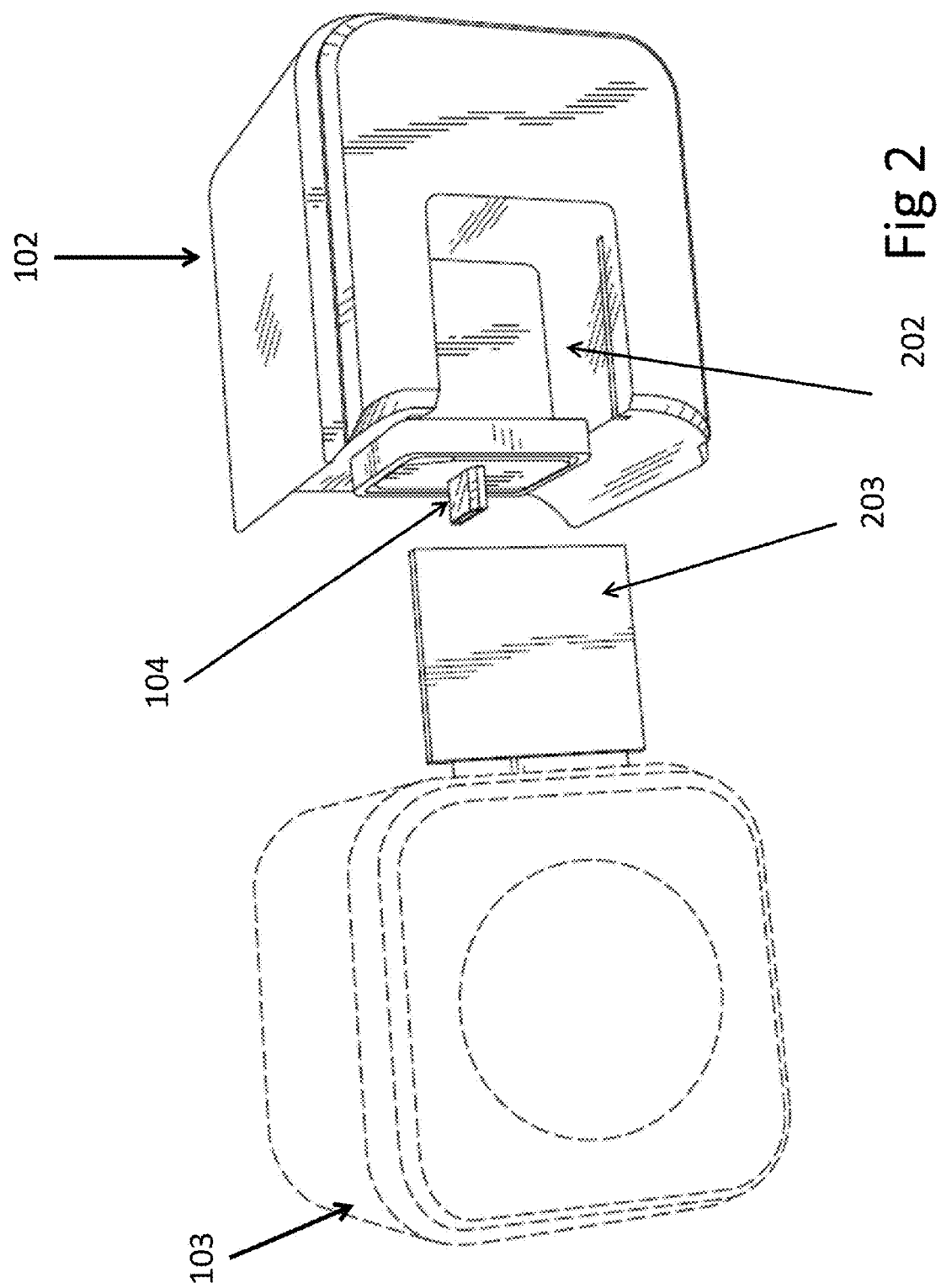
FIG. 2 is a front perspective view of the power supply apparatus of the present invention shown uncoupled to an electronic device.

Turning to FIG. 2, the housing 102 includes a cover receiver 202. The cover receiver 202 is configured to accept a battery or charging port cover 203 of the electronic device. The port cover 203 has an open configuration and a closed configuration. In the provided illustration, the electronic device 103 utilizes the port cover 203 to provide cover for the power port of the electronic device 103. The port cover 203 when in the open configuration can be damaged when the electronic device 103 is in use. Here the port cover 203 is a door that is hinged on one side. However, those possessing an ordinary level of skill in the art will appreciate that the port cover 203 can be of a bi-fold, swing or slide design. The cover receiver 202 is configured to accept the port cover 203 when in the open configuration and secure the port cover 203 such that unobstructed access is provided to the power port. As such, the cover receiver 202 is configured to enclose or otherwise protect the port cover to prevent damage from occurring. Furthermore, by providing a receiver for the port cover 203, the overall profile of the electronic device 103 is maintained even while coupled to the power supply.

In one or more embodiments, the cover receiver 203 comprises a void within the housing configured to accept a port cover of a particular size or smaller. In a particular embodiment, the void is further configured with a plurality of notches, cutouts, or groves that are designed to accept a port cover having dimensions larger than the cover receiver proper.

Figure 3:
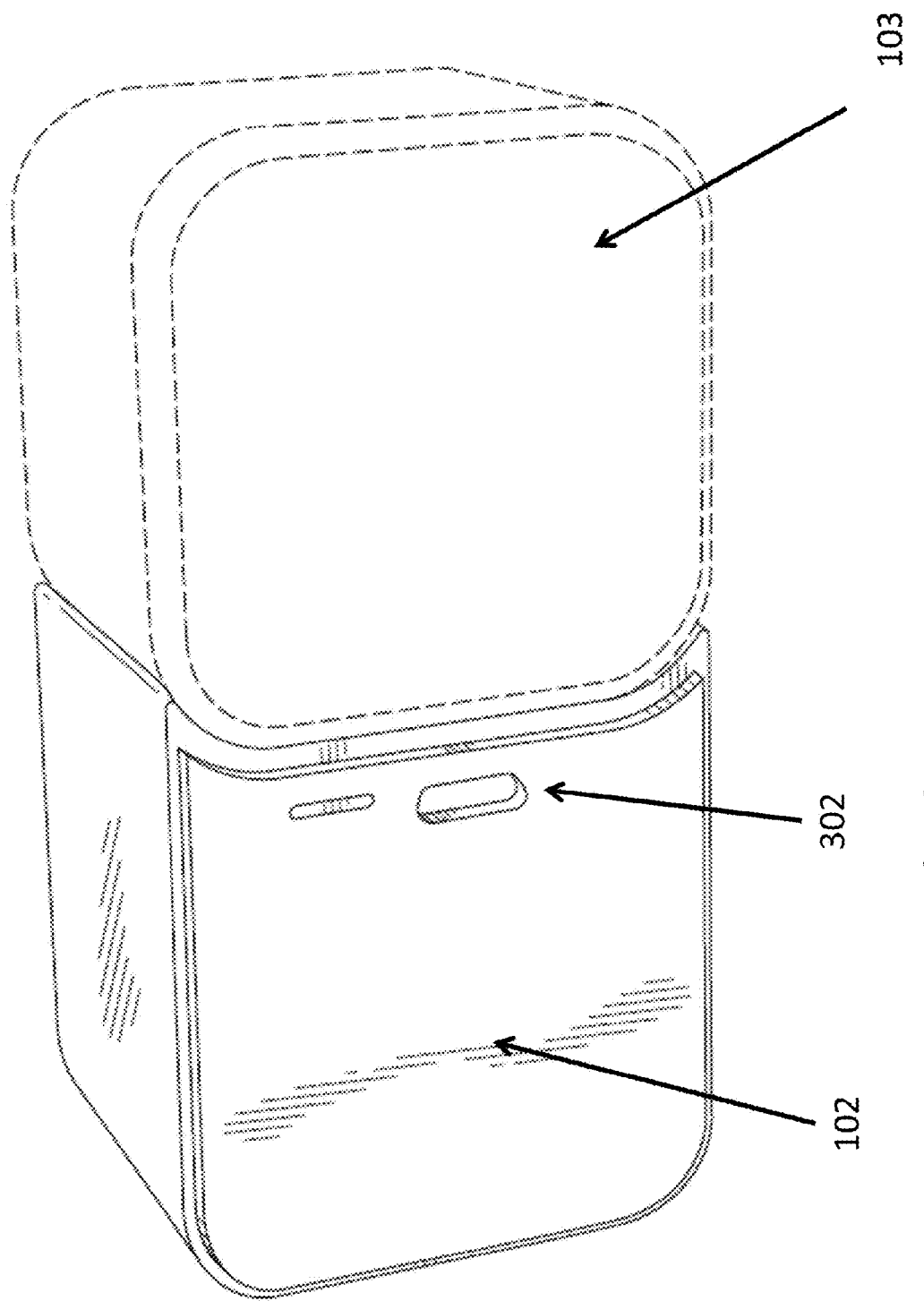
FIG. 3 is a rear perspective view of the power supply apparatus of the present invention shown coupled to the electronic device.
Figure 4:
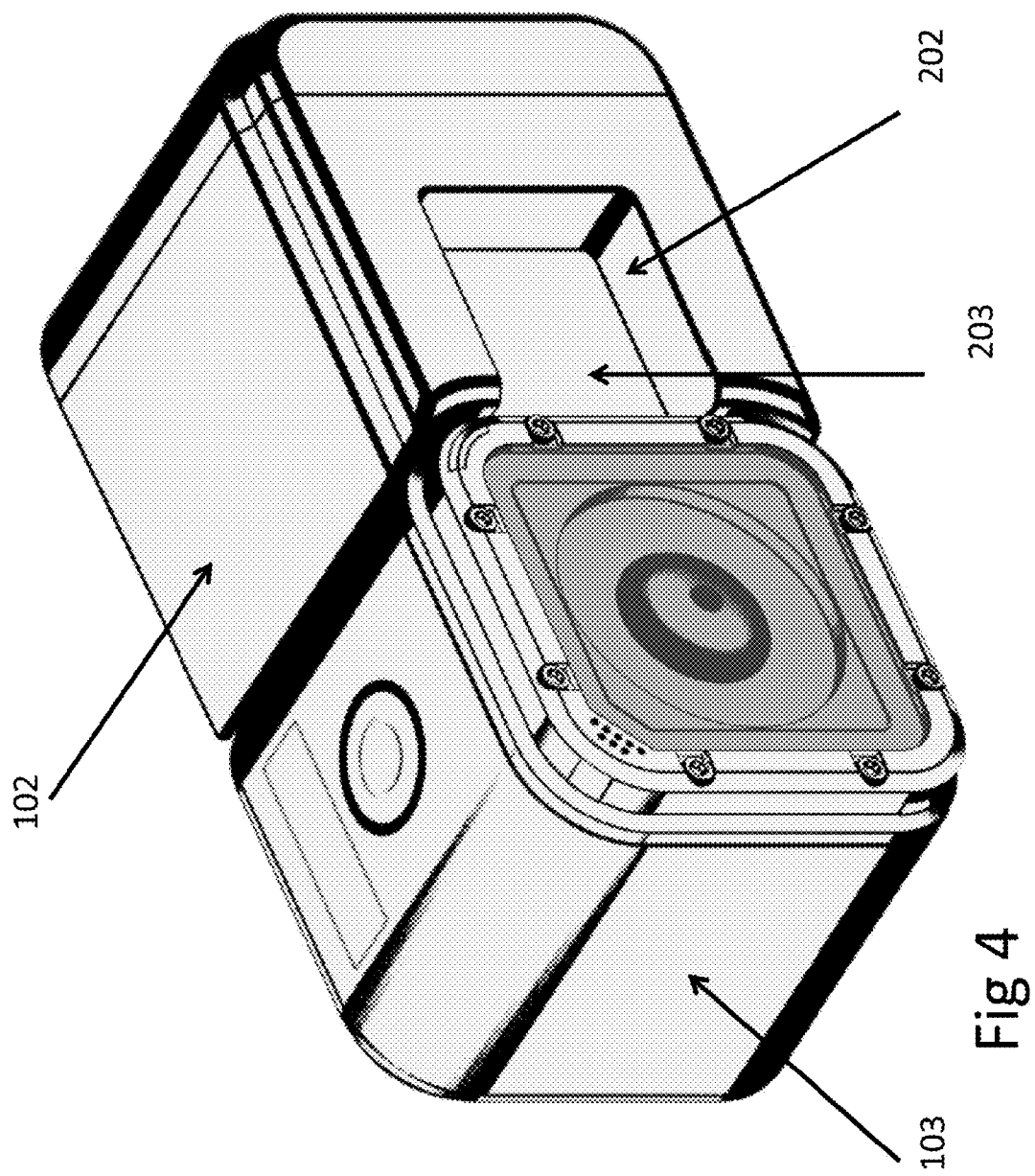
FIG. 4 is a front perspective view of the power supply apparatus of the present invention shown coupled to the electronic device.

As provided in FIGS. 3 and 4, the power supply apparatus 100 is coupled to the electronic device 103. As part of the coupling, the power interface 104 is coupled, connected or placed in contact with power port of the electronic device 103 and electrical energy is transferred thereto. In a particular arrangement the housing 102 is further equipped with a switch (not shown) that controls the flow of electrical energy to the electronic device 103.

As shown in more detail in FIG. 3, the housing 102 is equipped in one arrangement with a securing mechanism 302 that couples the electronic device 103 to the housing 102. In a particular embodiment the securing mechanism 302 is a hook, tab, clamp prong or other element that is configured to secure the electronic device 103 to the housing 102 and prevent undesired separation of the power interface 104 from the power port.

With particular attention to FIG. 4, the cover receiver 202 receives the port cover 203 and causes the profile of the electric device 103 to be extended in at least one dimension without obstruction, thereby preserving the look and feel of the electronic deice 103 while supplying additional power.

Figure 5:
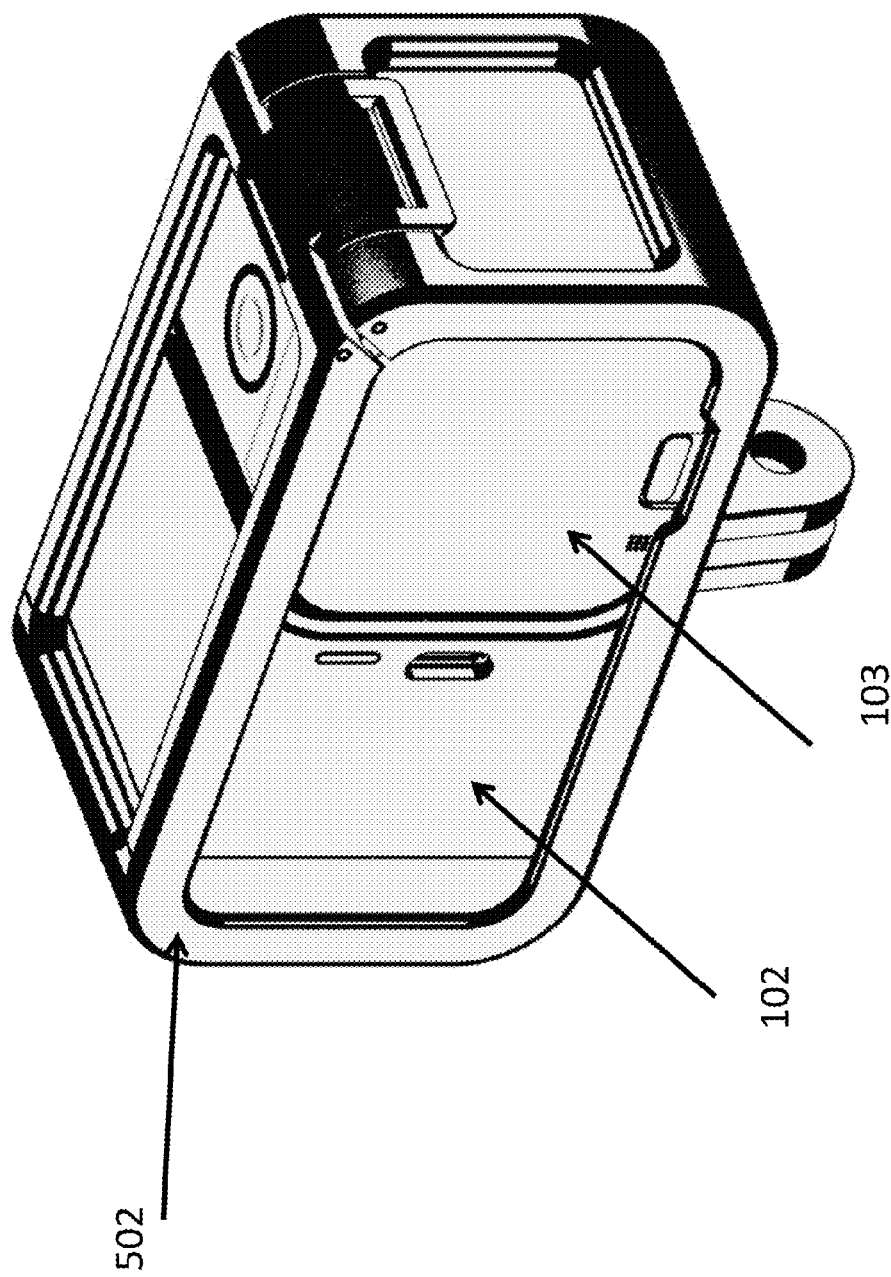
FIG. 5 is a rear perspective view of the power supply apparatus of the present invention shown coupled to an electronic device and encased in a protective enclosure.

As shown in FIG. 5 the coupled battery device 100 within housing 102 and electronic device 103 are enclosed in a protective encasement 502. In one arrangement, the encasement allows for access to all of the ports and buttons on each of the devices, but provides shock resistance and protection for sensitive portions of the coupled devices. In an alternative configuration, the encasement provides water, dust, frost or other environmental protection to the coupled devices. For example, in one or more embodiments, the coupled devices are enclosed in a translucent case that is substantially impermeable to water. In an alternative arrangement, the encasement is substantially insulated so as to prevent loss of battery power due to extreme low temperatures.

It should be understood that various combinations, alternatives and modifications of the present invention could be devised by those skilled in the art. The present invention is intended to embrace all such alternatives, modifications and variances that fall within the scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise.

It should be noted that use of ordinal terms such as "first," "second," "third," etc., or primary and secondary in the specification or claims to modify an element does not by itself connote any priority, precedence, or order of one element over another or the temporal order in which acts of a method are performed, but are used merely as labels to distinguish one element having a certain name from another element having the same name (but for use of the ordinal term).

The above-description of embodiments of the present invention are not intended to be exhaustive or to limit the systems and methods described to the precise form disclosed. While specific embodiments of, and examples for, the apparatus are described herein for illustrative purposes, various equivalent modifications are possible within the scope of other articles and methods, as those skilled in the relevant art will recognize. The teachings of articles and methods provided herein can be applied to other devices and arrangements, not only the apparatus and methods described above.

The elements and acts of the various embodiments described above can be combined to provide further embodiments. These and other changes can be made to the system and methods in light of the above detailed description. While the invention has been particularly shown and described herein, with reference to preferred embodiments thereof, it will be understood by those skilled in the art that various changes in form and details may be made therein without departing from the spirit and scope of the invention.

What is claimed:

1. A power supply apparatus configured for coupling to an electronic device having a power port integral to the electronic device and the electronic device having a hardware profile, the power supply apparatus comprising:
    a housing configured to extend a profile of the electronic device in at least one dimension;
    a power source integral to the housing;
    a power interface extending from the housing and configured to couple with the power port of the electronic device; and
    a securing device integral to the housing and configured to couple the housing to the electronic device;
    wherein the electronic device includes a port cover having an open and closed configuration and the housing of the power supply apparatus is configured with a recessed portion to receive the port cover in the open configuration.

2. The power supply apparatus of claim 1, further comprising an encasement configured to encase the power supply apparatus and the electronic device.

3. The power supply apparatus of claim 2, wherein the encasement is waterproof.

4. The power supply apparatus of claim 1, wherein the power source is replaceable.

5. The power supply apparatus of claim 4, wherein the power source is one of a fuel cell, a battery, or a capacitor.

6. The power supply apparatus of claim 1, wherein the housing further comprises a charging port electrically connected to the power supply and configured to receive electrical energy and transmit received electrical energy to the power supply.

7. The power supply apparatus of claim 1, wherein at least one surface of the housing of the power supply apparatus is configured in a complementary shape to at least one surface of the electronic device.

8. A power supply apparatus configured for coupling to a portable camera device, the portable camera device having a power port integral to the portable camera device, the power port protected by a cover having an open position and a closed position and the portable camera device having a hardware profile, the power supply apparatus comprising:
    a housing configured to extend a profile of the electronic device in at least one dimension,
    a power source integral to the housing;
    a power interface extending from the housing and configured to couple with the power port of the portable camera device;
    a receiving port integral to the housing and configured to receive the cover when in the open position.

9. The power supply apparatus of claim 8, further comprising an encasement configured to encase the power supply apparatus and the portable camera device.

10. The power supply apparatus of claim 9, wherein the encasement is waterproof.

11. The power supply apparatus of claim 8 further comprising a securing device integral to the housing and configured to couple the housing to the portable camera device.

* * * * *